United States Patent
Hagelin et al.

(10) Patent No.: US 6,430,331 B1
(45) Date of Patent: *Aug. 6, 2002

(54) DOUBLE HERMETIC PACKAGE FOR FIBER OPTIC CROSS CONNECT

(75) Inventors: Paul M. Hagelin, Saratoga; Jeffrey W. Scott, Carpinteria; John Fling, Little River, all of CA (US)

(73) Assignee: C Speed Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/990,476

(22) Filed: Nov. 20, 2001

Related U.S. Application Data (63) Continuation-in-part of application No. 09/549,798, filed on Apr. 14, 2000.
(51) Int. Cl.[7] .................................................. G02B 6/26
(52) U.S. Cl. ............................ 385/17; 385/18; 385/19; 385/223; 385/224; 385/872; 385/31
(58) Field of Search ............................... 385/15–19, 31; 359/223, 224, 872, 873

(56) References Cited

U.S. PATENT DOCUMENTS 5,247,593 A  9/1993 Lin et al.
5,953,469 A  9/1999 Zhou
6,097,859 A  8/2000 Solgaard et al.

OTHER PUBLICATIONS

Lin,Y. Lih et al., "Micro–Electro–Mechanical System (MEMS) for WDM Optical–Crossconnect Networks," IEEE 1999, pp. 954–957.

Koh, Seungug et al., "Optoelectronic Multichip Modules based on MicroOptpElectroMechanical System Fabrication Techniques," IEEE 1996, pp. 53–60.

Primary Examiner—Cassandra Spyrou
Assistant Examiner—Fayez Assaf
(74) Attorney, Agent, or Firm—Sawyer Law Group LLP (57) ABSTRACT

The present invention provides a double fiber optic cross connect (OXC) package. The double package includes an input optical fiber; a substrate with a first surface and a second surface, optically coupled to the input optical fiber; a first cap optically coupled to the second surface of the substrate; a micromirror array optically coupled to the first cap; a second cap optically coupled to the micromirror array; and an output optical fiber optically coupled to the second cap. The first cap, along with a substrate populated with a micromirror array and a set of sidewalls, form at least one volume which is preferably hermetically sealed. This volume is further enclosed by the second cap with another set of sidewalls.

26 Claims, 11 Drawing Sheets

Top View
FIG. 3A

Side View
FIG. 3B

Top View (photodetectors)
FIG. 4A

Side View
FIG. 4B

DOUBLE HERMETIC PACKAGE FOR FIBER OPTIC CROSS CONNECT

CROSS-REFERENCE TO RELATED APPLICATIONS

This application is a Continuation-in-Part of co-pending U.S. patent application Ser. No. 09/549,798, entitled "Double Hermetic Package for Fiber Optic Cross Connect," filed on Apr. 14, 2000.

FIELD OF THE INVENTION

The present invention relates to fiber optic cross connects, and more particularly to the packaging for fiber optic cross connects.

BACKGROUND OF THE INVENTION

The use of optical cross connect (OXC) switching systems are well known in the art for directing a light beam from one optical port in an optical transmission system to another optical port. In a typical OXC, a plurality of input optical fibers, or ports, carry light beams into the OXC. The OXC then directs, or switches, the light beams to their respective plurality of output ports. Many conventional OXCs perform the switching utilizing micromirrors, which are micro-machined on a substrate. The micromirrors are used to reflect a light beam from an input port to a particular output port. In this specification, the words "input" and "output" are used to indicate a direction of travel for a light beam into and out of, respectively, a switch. In reality, the input and output ports can be used simultaneously for input and output, as is the case in bi-directional data transfer.

High port count switches utilizing micromirrors are of high demand in the industry. Such switches require a tight packing density of the micromirrors onto the substrate. Some conventional switches use a digital switching matrix for N input and N output ports with an NxN array of micromirrors. This requires a total of $N^2$ number of micromirrors. However, this architecture becomes impractical for switch port counts greater than a few hundred.

For conventional OXCS, the optical path from the collimating optics to the micromirror increases with port count and varies substantially. A large distance between collimating optics and the micromirrors requires high optical and manufacturing precision to ensure that the input beam is aligned with the micromirrors.

Accordingly, there exists a need for an improved OXC package which reduces the size of the package while still allowing a high port count. The improved package should also minimize optical loss and crosstalk and also allow a tight packing density of micromirrors. The present invention addresses such a need.

SUMMARY OF THE INVENTION

The present invention provides a double fiber optic cross connect (OXC) package. The double package includes an input optical fiber; a substrate with a first surface and a second surface, optically coupled to the input optical fiber; a first cap optically coupled to the second surface of the substrate; a micromirror array optically coupled to the first cap; a second cap optically coupled to the micromirror array; and an output optical fiber optically coupled to the second cap. The first cap, along with a substrate populated with a micromirror array and a set of side walls, form at least one volume which is preferably hermetically sealed. This volume is further enclosed by the second cap with another set of side walls.

DETAILED DESCRIPTION

The present invention provides an improved optical cross connect (OXC) package. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

The improved OXC package in accordance with the present invention provides a double package comprising a first cap with reflecting surfaces and a second cap. The first cap, along with a substrate populated with a micromirror array and a set of sidewalls, form a volume which is preferably hermetically sealed. This volume is further enclosed by the second cap with another set of sidewalls. With the first cap, only a short distance is used in redirecting the light. This short distance can be uniform for each micromirror on the switch. With the second cap, the light beam is folded during the switching operation, resulting in a smaller switch package.

To more particularly describe the features of the present invention, please refer to FIGS. 1 through 10 in conjunction with the discussion below.

Figure 1:
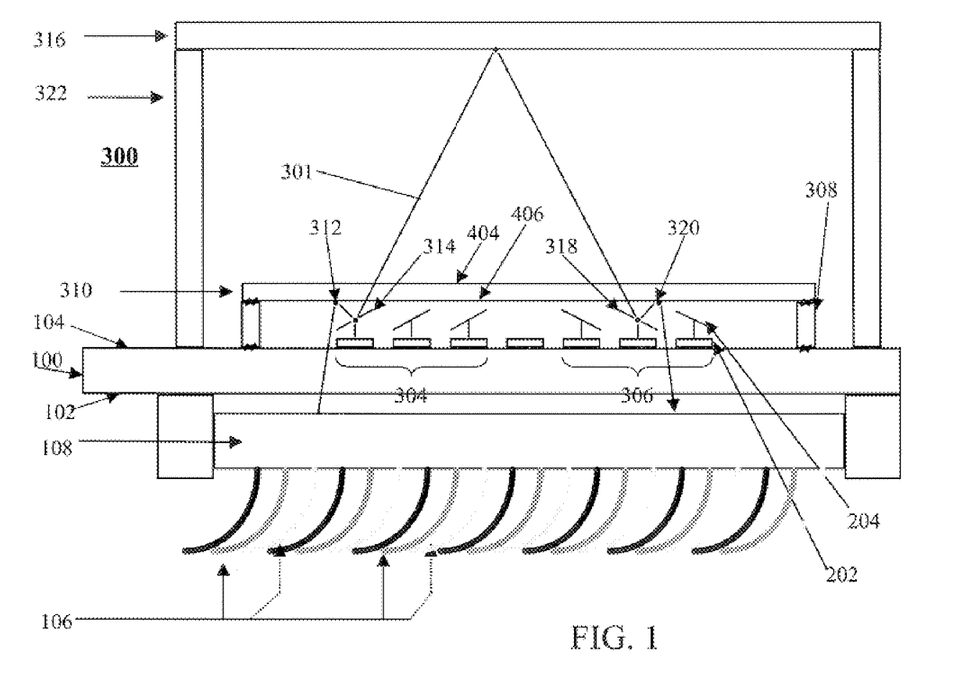
FIG. 1 illustrates a side view of a preferred embodiment of a switch architecture with a double package in accordance with the present invention.

FIG. 1 illustrates a side view of a first preferred embodiment of a switch architecture with a double package in accordance with the present invention. This architecture comprises a substrate 100 and preferably at least one two dimensional array of micromirrors 204 on the substrate surface 104. In the first preferred embodiment, the micromirrors 204 are divided into a plurality of input mirrors 304 and a plurality of output mirrors 306. The substrate 100 is attached to the sidewalls 308. The sidewalls 308 are then attached to a first cap 310. Alternatively, the plurality of input mirrors 304 and the plurality of output mirrors 306 are in two separate micromirror arrays, housed in separate hermetic packages. This provides modularity to the micromirrors 204.

Figure 2:
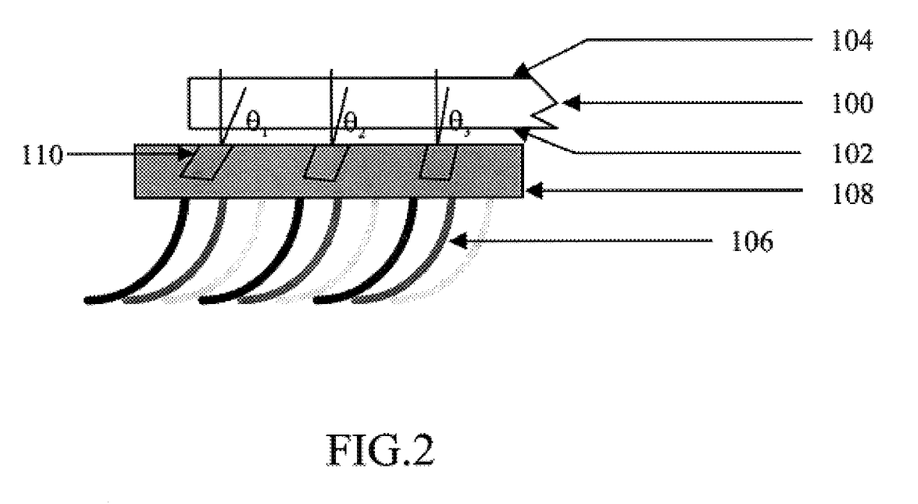
FIG. 2 illustrates a side view of a substrate in the switch architecture with a double package in accordance with the present invention.

FIG. 2 illustrates a side view of the substrate in the switch architecture with a double package in accordance with the present invention. The preferred embodiment of the substrate 100 is a rigid and transparent single or multi-layered planar slab with a first 102 and second 104 parallel surfaces. The substrate 100 may be composed of any material which allows the substrate 100 to be optically transparent to the wavelengths of interest. As illustrated, light may enter the substrate 100 from the first surface 102 via a plurality of optical fibers 106 attached to a fiber housing 108. The housing 108 can include a single holder or more than one holder containing independently aligned optical fibers 106 and collimators. The substrate 100 is preferably coated on the first 102 and second 104 surfaces with conventional anti-reflective coatings to avoid reflections back to the fiber housing 108. Also, the substrate 100 can be coated with a conductive layer to prevent charge build up on the substrate 100. The light then traverses through the substrate 100 and exits from the second surface 104. The micromirrors 204 (FIG. 1) and other reflective elements populate the second surface 104 of the substrate 100. These optical elements may comprise either static mirrors, active mirrors, or a combination of static and active mirrors. The optical elements may also comprise mirrors which can move approximately perpendicular to the substrate surfaces 104, such that the length of the optical beam path is adjustable. In the first preferred embodiment, the housing 108 may contain embedded optical collimators 110. Each collimator 110 is placed at a specific angle, $\theta_1$–$\zeta_3$. The housing 108 may be composed of any appropriate material. Various methods of collimation and/or redirection may be used, such as with lenses, diffractive components, and other appropriate components. The term "collimator", as used in this specification, refers to any of these various methods.

Although the first preferred embodiment of the substrate is described above as being a transparent slab, one of ordinary skill in the art will understand that any substrate which allows light beams to traverse through it is within the spirit and scope of the present invention. For example, the substrate may be a silicon wafer with holes etched all the way through to allow light beams to pass through it. Alternatively, the substrate may be a doubleside polished silicon wafer on which the micromirrors are fabricated. In this case, appropriate anti-reflecting coatings are applied to both surfaces of the substrate.

The substrate is further described in co-pending U.S. patent application entitled "Fiber Optic Cross Connect with Transparent Substrate", Ser. No. 09/549,789, filed on Apr. 14, 2000. Applicants hereby incorporate this patent application by reference.

Returning to FIG. 1, the substrate 100, sidewalls 308, and the first cap 310 together provide at least one volume. This volume is preferably hermetically sealed. Additional side walls (not shown) may partition the volume such that the input mirrors 304 and the output mirrors 306 are separate and hermetically sealed. The fibers 106 can be dust and moisture proof sealed without the need to hermetically seal them. This provides ease in assembly of the switch with the fibers 106. If the volume is hermetically sealed, since this volume is small, it is possible to safely pressurize the volume prior to sealing. A high pressure within the volume will assist in damping the mechanical ringing of the micromirrors 204, as well as allow better heat dissipation due to greater thermal conductivity.

Figures 3A, 3B:
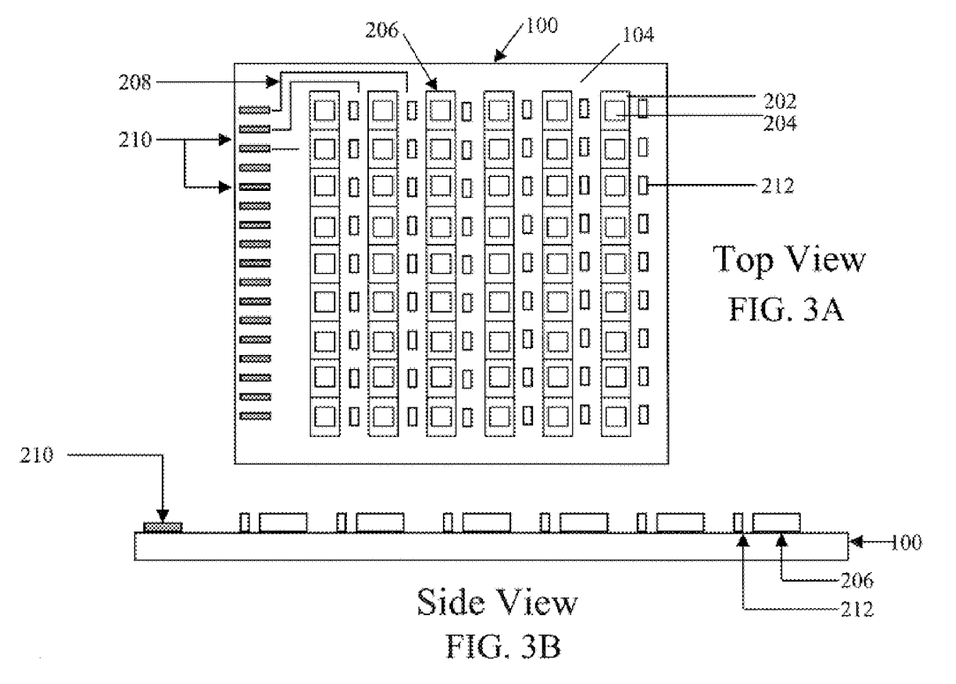
FIGS. 3A and 3B illustrate a top view and a side view, respectively, of a method of substrate population for the switch architecture with a double package in accordance with the present invention.

Within this volume, chips with micromirrors 204, conductive traces, and integrated circuits populate the surfaces, 104 or 102, of the substrate 100 or surfaces 404 and 406 of the first cap 310. The population of the second surface 104 of the substrate 100 with micromirrors 204 may be accomplished in a variety of ways. One way of populating the second surface 104 is illustrated in FIGS. 3A and 3B. FIGS. 3A and 3B illustrate a top view and a side view, respectively, of a method of substrate population for a switch architecture with a double package in accordance with the present invention. A plurality of optical elements 202, each containing at least one micromirror 204, are placed onto the second surface 104 of the substrate 100. In the first preferred embodiment, the optical elements 202 are placed and configured on the substrate 100 in strips 206, with a plurality of optical elements on each strip. The strips 206 may then be located sparsely on the substrate 100. Because each group of micromirrors 204 is on a separate optical element 202, the optical elements 202 may be separately selected to be placed onto the substrate 100, providing flexibility in how the substrate is populated. Chips with defective micromirrors 204 may be discovered prior to configuration of the optical elements 202 so that only good optical elements 202 are used in the micromirror array 204. This improves the yield requirement of the optical elements. Also, if any of the micromirrors 204 become damaged after placement, its optical element may be replaced without disturbing the other optical elements. The entire micromirror array 204 need not be discarded.

Although the present invention is described as fabricating the optical elements in strips, one of ordinary skill in the art will understand that any optical element cluster size, including single optical element size, may be used without departing from the spirit and scope of the present invention.

Although the present invention is described with the input and output mirrors on the same substrate, one of ordinary skill in the art will understand that they may be on separate substrates, and/or on separate substrates not adjacent to each other, without departing from the spirit and scope of the present invention.

The second surface 104 may also comprise conductive traces 208 for the transfer of electrical signals from wire bonds 210, or other electrical connections to external conductors, to the micromirror array 204 for the purpose of controlling the micromirrors 204 or signal sensing. The substrate 100 also allows inclusion of integrated circuits 212 close to the micromirrors 204 for control and positioning of the micromirrors 204. This eliminates the need for a large separation between the separate chip for the integrated circuits and the micromirrors 204, as is required with conventional switches. The quality of the sensing signal can be a function of the distance between the integrated circuits and the micromirrors 204. Integrated MEMS/CMOS processes are not needed if the circuitry for sensing and control can be placed nearby on a separate chip. Also, with the conductive traces 208 and the integrated circuits 212 so close to the micromirror array 204, shunt capacitance and noise coupling between them are reduced. Each integrated circuit 212 may be placed at the same distance from their respective micromirror, either on the micromirror chips 202 and/or on the substrate 100. This allows even lower shunt capacitance and noise coupling, providing clearer signals.

The housing 108 (FIG. 2) is aligned such that all components, such as integrated circuits 212 and conductive traces 208, are absent from the path of light beams from the fibers 106. By using this modular approach to substrate population, high port count switches may be formed. The chips 202, micromirrors 204, and integrated circuits 212 may all be tested prior to final assembly, so that the switch has a lower failure rate.

This modular approach to substrate population is further described in co-pending U.S. patent application, entitled "Modular Approach to Substrate Population For Fiber Optic Cross Connect", Ser. No. 09/549,799, filed on Apr. 14, 2000. Applicant hereby incorporates this patent application by reference.

Returning to FIG. 1, the first cap 310 is a slab with its larger surfaces parallel to the substrate surface 104. Above the first cap 310 is a second cap 316. Sidewalls 322 attach the second cap 316 either to the substrate 100 or the first cap 310. Preferably, the sidewalls 322 are hermetically attached to the second cap 316 and the substrate 100. In final assembly, a double packaging architecture is provided. Then, the fiber optic array 106 is aligned, and the housing 108 is attached to the substrate 100. A preferred method for the alignment of the fiber optical array 106 is described in co-pending U.S. patent application entitled, "Apparatus and Method for Alignment and Assembly of Micro Devices", Ser. No. 09/896,012, filed on Sep. 26, 2001. Applicant hereby incorporates this patent application by reference.

In performing a switching operation, a light beam 301 enters the switch 300 from the substrate surface 102 via an input optical fiber 106 attached to the housing 108. A light beam 301 traverses through the substrate 100 and exits from the surface 104 at a portion absent of components, such as the integrated circuits 212 and conductive traces 208. After the light beam 301 exits the substrate surface 104, a reflecting area 312 on the first cap 310 directs the beam 301 onto a specific input mirror 314. The reflecting area 312 may be on either of the surfaces of the first cap 310.

The reflecting area 312 may be a flat mirror or a curved mirror. If curved, can function as collimators 110 (FIG. 2) in the housing 108. If so, then the collimated portion of the beam 301 then begins at this mirror on the first cap 310. The reflecting area 312 can also be fabricated into an appropriate diffractive lens, to accomplish the same objective as the curved mirror. The reflecting area 312 can also be a molded mirror. Curved or flat mirrors 320 can also be used to direct the optical beam to the center of the output mirrors 306 when the micromirror at the center is in mechanical equilibrium. This maximizes the usable tilt range of the micromirror. Alternatively, the collimator can be tilted or offset from the axis of the fibers 106 to achieve the desired optical beam tilt. After reflection from the input micromirror 314, the light beam 301 is directed through the first cap 310 towards the second cap 316. The area through which the beam 301 penetrates the first cap 310 is transparent. The first or second surface of the second cap 316 is partially or wholly reflective. A reflection occurs at the second cap 316 which directs the light beam 301 to the desired output mirror 318. Importantly, the reflection from the input mirror 314, to the second cap 316, and then to the output mirror 318, folds the beam 301 so that the distance between switch components 314 and 318, and thus the height of the package 300, is drastically reduced.

The output mirror 318 directs the light beam 301 towards another reflecting area 320 on the first cap 310. As with the reflecting area 312, the reflecting area 320 can be a flat mirror, diffractive lens, a curved mirror, or a molded mirror. The reflecting area 320 functions in a similar manner as reflecting area 312. The reflecting area 320 directs the beam 301 through the substrate 100 from the surface 104. The beam 301 is refocused by a collimator 110 (FIG. 2) in the housing 108 and directed to a specific output fiber 106. In this manner, a light beam from any input fiber can be directed to any output fiber.

The use of the first cap 310 allows for only a short distance to be used in redirecting the light 301 from the collimator 110 onto the input mirror 314, and from the output mirror 318 back to the collimator 110. The major portion of the collimated beam, i.e., from the input mirror 314 to the second cap 316 and then to the output mirror 318, is thus available for scanning. Preferably, this portion is approximately the Rayleigh length of the beam, with the diameter of the micromirrors 204 optimized for this beam profile. In this specification, the Rayleigh Length of the light beam is $2\pi w_0^2/\lambda$, where $w_o$ is the $1/e^2$ waist radius of the light beam, and $\lambda$ is the optical wavelength. The "waist" of the beam then corresponds to approximately the reflecting location on the second cap 316. It is important to limit the scanned portion of the beam to this length because diffraction of the light beam beyond the Rayleigh Length can produce increased loss and crosstalk. The Rayleigh Length is well known in the art and will not be described further here. Additionally, with the substrate 100 in accordance with the present invention, the redirection length is approximately the same for each micromirror 204 in the array. This allows for the optimization of the number of ports. With the micromirrors 204 in such close proximity to the collimator 110, the fibers 106 and/or the collimators 110 have greater angular alignment tolerance. Although the switch architecture is described with the micromirrors 204 on the substrate 100, micromirrors 204 or other micromirrors may also be located on the first cap 310 without departing from the spirit and scope of the present invention.

In the first preferred embodiment, arrays of photodetectors, or other types of detectors, for monitoring traffic and alignment may also be used with the architecture which provides a uniform redirection length and folding of light beams in accordance with the present invention. The information received from the photodetectors can be used to confirm the proper selection of input/output channels in the light beams and for monitoring the data flow. Fast photodetectors can monitor traffic in real time while slow photodetectors can be used to confirm correct channel switching.

Figure 4A:
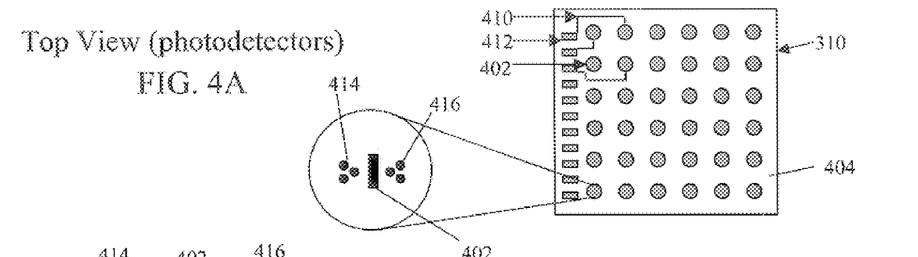
FIGS. 4A and 4B illustrate a top view and a side view, respectively, of an array of photodetectors on the first cap in accordance with the present invention.
Figure 4B:
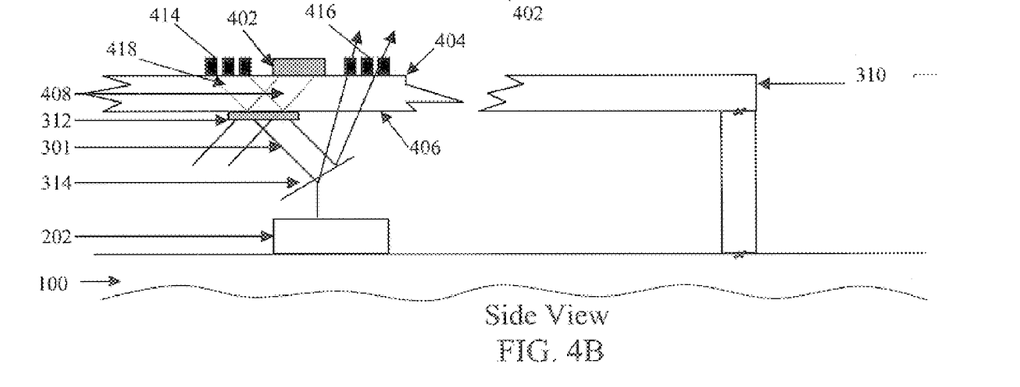

One possible location for the array of photodetectors is on the first cap 310. FIGS. 4A and 4B illustrate a top view and a side view, respectively, of an array of photodetectors on the first cap in accordance with the present invention. An array of photodetectors 402 can be attached on the top surface 404 of the first cap 310 for detection and interpretation of the light beam 301. As illustrated in FIG. 4B, in this case, the reflecting surface 312 in the first cap 310 is on the bottom surface 406 and partially transmitting in order to allow some light 408 to proceed to the photodetector 402. The top surface 404 (FIG. 4A) would contain conductive traces 410 to carry the photodetector signals to the edge of the first cap 310, where it would be electrically connected to sensing electronic circuits.

In addition to photodetector 402, clusters of two or more photodetectors 414, 404 can be used on either side of a photodetector 402 to perform other monitoring or sensing functions, such as mirror angle sensing. Assuming that the light beam 301 is traveling in the output direction, the three photodetector signals around the beam 418 can be used to interpret the 'centering' of the beam 418. By combining information from the triangular clusters of photodetectors 414, 416 around each beam 418, and the optical power focused into a fiber, the required mirror position for maximum optical power transfer can be determined. By monitoring this information at the input mirrors 304 and the output mirrors 306, mirrors can be aligned using light that propagates from the input to output or from output to input. The photodetectors can also monitor light which is injected onto the data beam, i.e., not the data itself. Every possible switch configuration can be optimized and the corresponding mirror position recorded, to be utilized repeatedly throughout the operating life of the switch.

Figure 5:
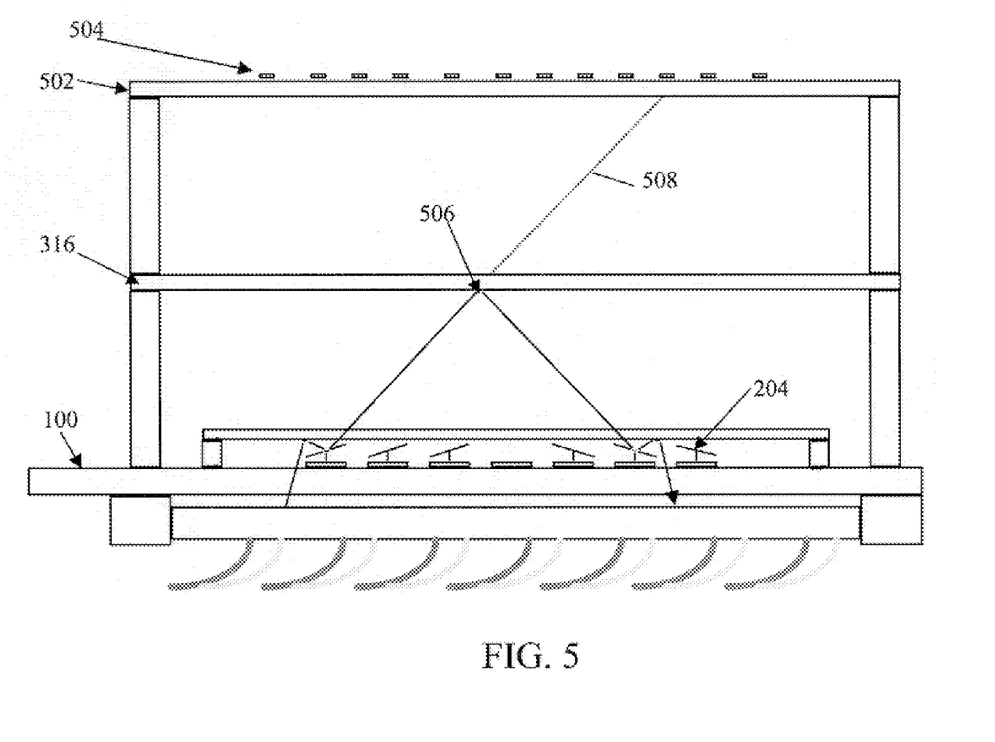
FIG. 5 illustrates an alternative switch architecture with a double package in accordance with the present invention.

FIG. 5 illustrates a second preferred embodiment of a switch architecture with a double package in accordance with the present invention. This architecture is identical to the architecture illustrated in FIG. 1 except for the addition of a third cap 502. An array of photodetectors 504 can be attached to the third cap 502. The third cap 502 is preferably positioned from the second cap 316 at a distance which is approximately the same distance from the micromirrors 204 to the second cap 316. In this case, the reflecting surface 506 on the second cap 316 is partially transmitting to allow some light 508 to proceed to the photodetectors 504. The characteristics of beams 508 at the micromirror array 204 are the same for the light beams on the third cap 502. Photodetectors 504 (single or in multiple) can be used similarly to the ones on the first cap 310 as described above to collect mirror position information or to monitor traffic on the optical beam.

Although the photodetectors are described as being located on the first cap 310 or the third cap 502, one of ordinary skill in the art will understand that the photodetectors may be placed at other locations without departing from the spirit and scope of the present invention. For example, a cluster of three photodetectors can be placed on the substrate 100 where the light beam enters/exists the substrate 100. For another example, the photodetectors may be in the housing 108 surrounding the collimators 110, or on the fibers 106.

Although the present invention has been described with the collimation methods described above, other methods may be used without departing from the spirit and scope of the present invention. For example, lenses may be used anywhere in the path of the light beam to perform the collimation function. One or more individual lenses may be used in combination with the optical fibers 106. The lenses may also be located as an array inside or outside of the substrate 100, on either the first 102 or second 104 surfaces, on either the top 404 or the bottom 406 surfaces of the first cap 310, on either the top or the bottom side of the second cap 316, or between the first cap 310 and the second cap 316. The term "lenses", as used in this specification, includes diffractive, refractive, reflective, and partially reflective lenses.

Other example collimation methods include: optical fibers with shaped ends; optical fibers with a particular refractive index profile; active or passive curved micromirrors; a waveplate between the first cap 310 and the second cap 316, which may also provide polarization management; tilted collimators with a flat first cap 310 and flat micromirrors 204; or any combination of the above.

Collimation may be performed only on either the input or the output side of the switch 300 or on both the input or output sides. Collimation may also be performed with non-uniform micromirror sizes, where a large micromirror with a collimator is on either the input or output side of the switch while a smaller micromirror is on the other side of the switch. Collimation and precise alignment may also be performed with a grating on the second cap 316.

Figure 6:
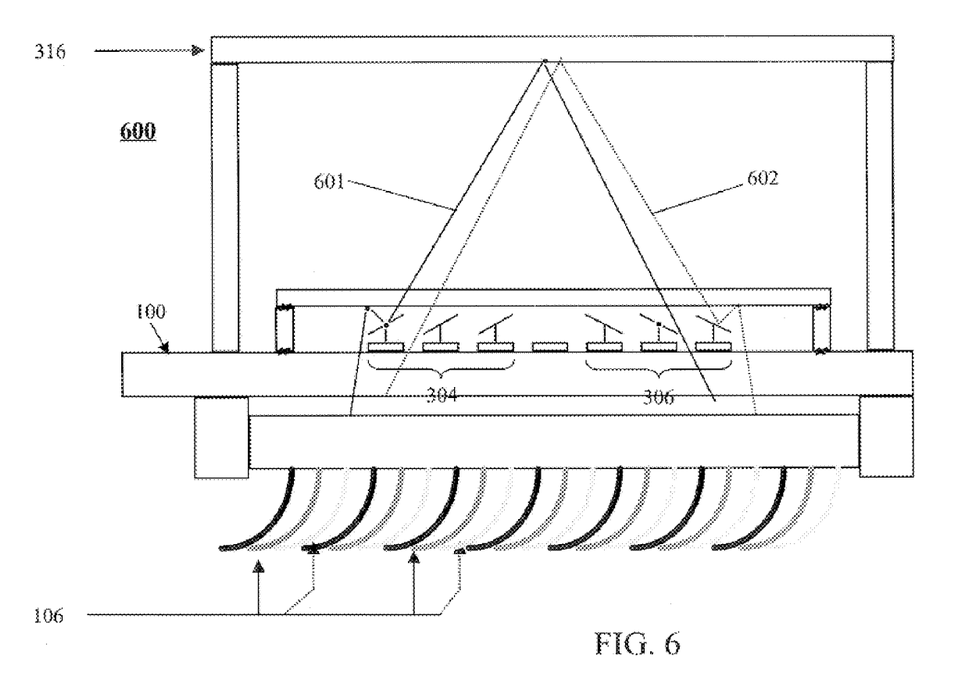
FIG. 6 illustrates a third preferred embodiment of a switch architecture with a double package in accordance with the present invention.

FIG. 6 illustrates a third preferred embodiment of a switch architecture with a double package in accordance with the present invention. The switch architecture 600 is the same as the architecture 300 in FIG. 1, except the light beam 601 is not reflected from an output micromirror 306. Instead, after being folded from the second cap 316, the light beam 601 is directly toward an output port. Alternatively, output micromirrors 306 may be omitted from the substrate 100 altogether.

Similarly, the switch architecture 600 can allow the light beam 602 to traverse to the second cap 316 without being reflected from an input micromirror 304. After being folded from the second cap 316, the light beam 602 is reflected from an output micromirror 306 to an output port. Alternatively, input micromirrors 304 may be omitted from the substrate 100 altogether.

Figure 7:
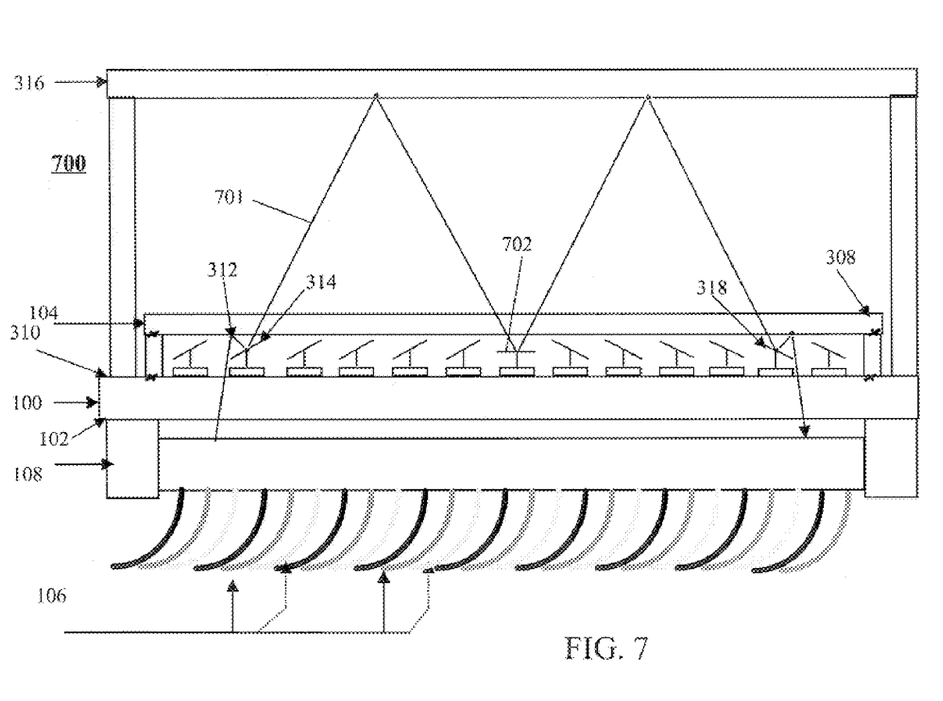
FIG. 7 illustrates a fourth preferred embodiment of a switch architecture with a double package in accordance with the present invention.

FIG. 7 illustrates a fourth preferred embodiment of a switch architecture with a double package in accordance with the present invention. The switch architecture 700 is the same as the architecture 300 in FIG. 1, except the light beam 701 is folded multiple times. The light beam 701 traverses through the substrate 100 and exits from the surface 104 at a portion absent of components, such as integrated circuits 212, and conductive traces 208. After the light beam 701 exits the substrate surface 104, a reflecting area 312 on the first cap 310 directs the beam 701 onto a specific input mirror 314. The light beam 701 then traverses the first cap 310 toward the second cap 316. A reflection occurs at the second cap 316 which directs the light beam 701 to another micromirror 702. The micromirror 702 directs the light beam 701 again toward the second cap 316. Another reflection occurs at the second cap 316 which directs the light beam 701 to an output micromirror 318. Since the light beam 701 is folded multiple times, the height of the package 700 is reduced even further than for package 300 (FIG. 1).

Although FIG. 7 illustrates only one additional reflection from the second cap 316, more additional reflections may be performed without departing from the spirit and scope of the present invention. For example, the micromirror 702 may be replaced by a bulk mirror.

Figure 8:
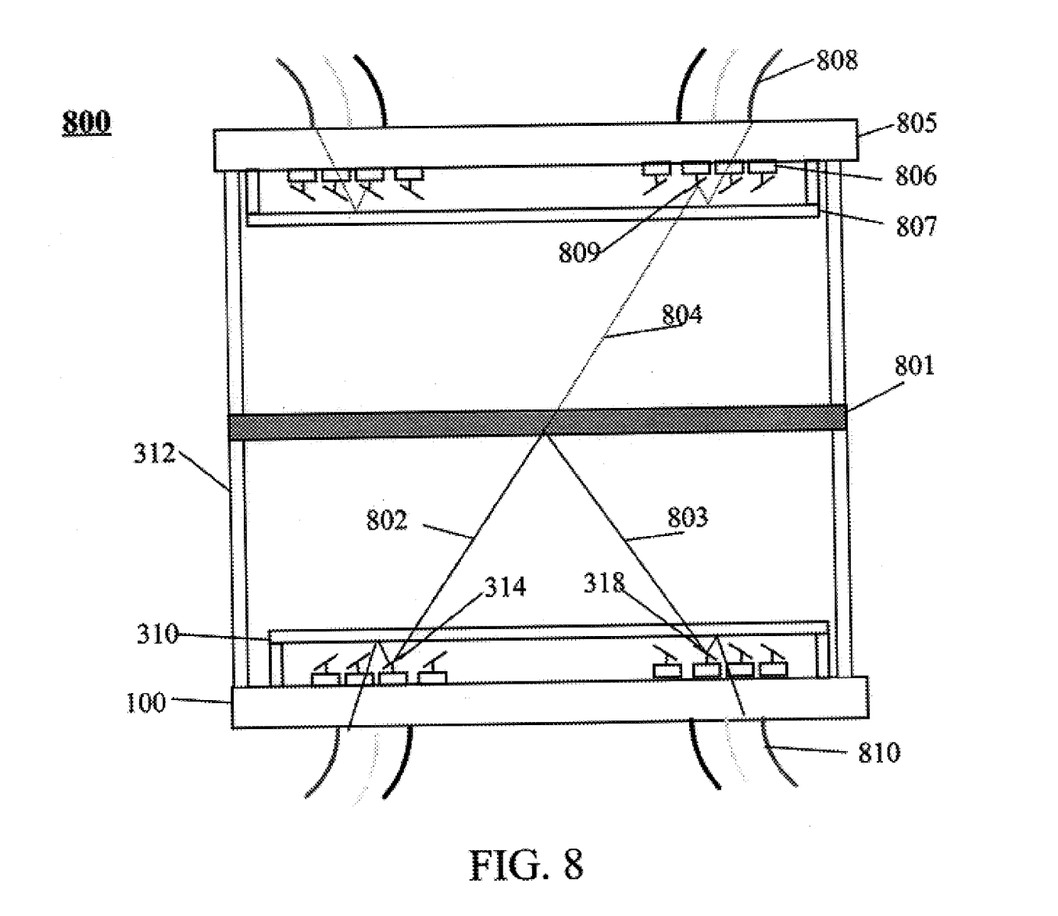
FIG. 8 illustrates a fifth preferred embodiment of a switch architecture with a double package in accordance with the present invention.

FIG. 8 illustrates a fifth preferred embodiment of a switch architecture with a double package in accordance with the present invention. In this architecture, a beam splitter 801 is used instead of the second cap 316. When the light beam 802 is transmitted to the beam splitter 801 from the input micromirror 314, it is split into two portions 803 and 804. A first portion 803 is reflected from the beam splitter 801 to the output micromirror 318 and to a first output fiber 810. A second portion 804 is transmitted through the beam splitter 801 to a second output fiber 808. Optionally, a second set of substrate 805, micromirrors 806, and cap 807 resides on the opposite side of the beam splitter 801. Thus, the transmitted second portion 804 is reflected by a micromirror 809 to the cap 807, which in turn reflects the second portion 804 to the second output fiber 808. The switch functions similarly when a light beam traverses in the opposite direction.

Figure 9:
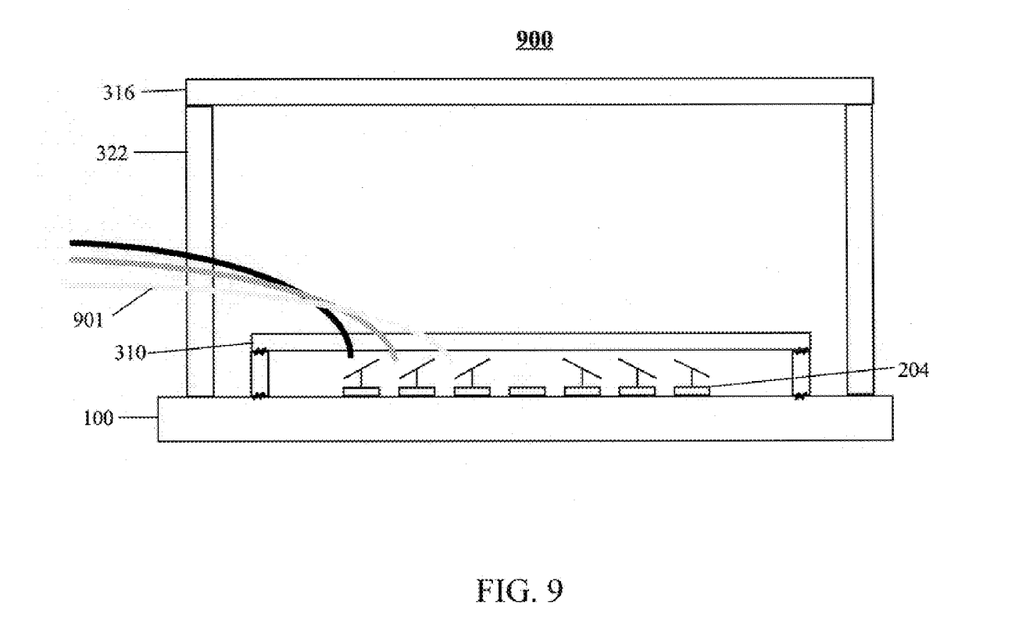
FIG. 9 illustrates a sixth preferred embodiment of a switch architecture with a double package in accordance with the present invention.

FIG. 9 illustrates a sixth preferred embodiment of a switch architecture with a double package in accordance with the present invention. The switch architecture 900 is the same as the architecture 300 (FIG. 1), except the optical fibers 901 direct light beams through the first cap 310 rather than the substrate 100. Lenses for collimation may be located in the first cap 310.

Figure 10:
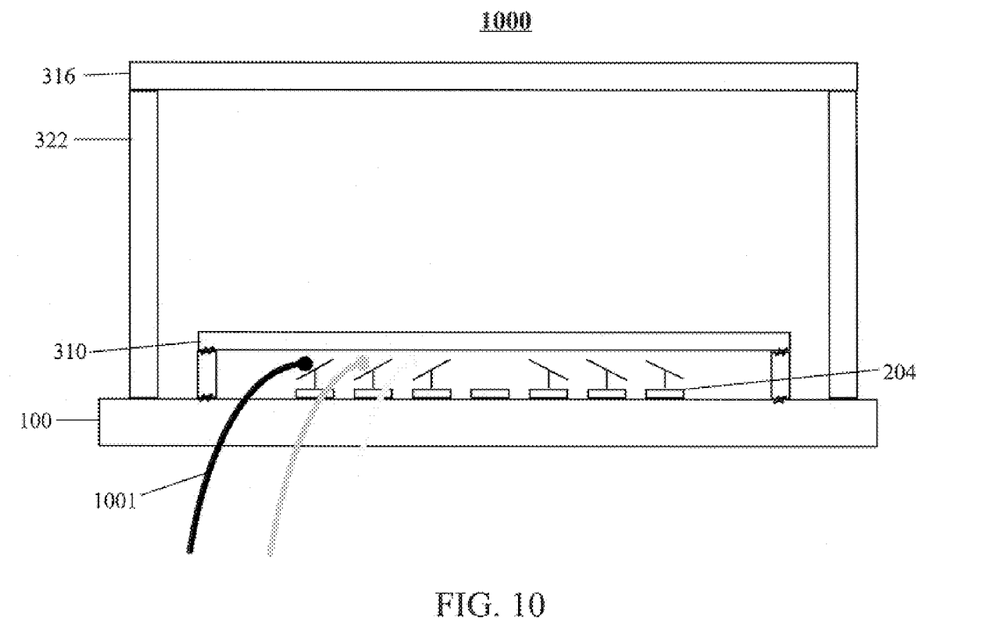
FIG. 10 illustrates a seventh preferred embodiment of a switch architecture with a double package in accordance with the present invention.

FIG. 10 illustrates a seventh preferred embodiment of a switch architecture with a double package in accordance with the present invention. The switch architecture 1000 is the same as the architecture 300 (FIG. 1), except waveguides 1001 extending through the substrate 100 direct light beams directly to the micromirrors 204.

In both switch architectures 900 and 1000, placing the optical fibers 901 and the waveguides 1001 in such manner brings the light beam in closer proximity to the micromirrors 204. This allows a greater ease of alignment. Other advantages include reducing the number of air/glass transitions and reducing loss. As the space occupied by the optical beam through substrate 100 is reduced or eliminated in the switch architecture 900 or 1000, there is more space for electronics or optical sensors.

Figure 11:
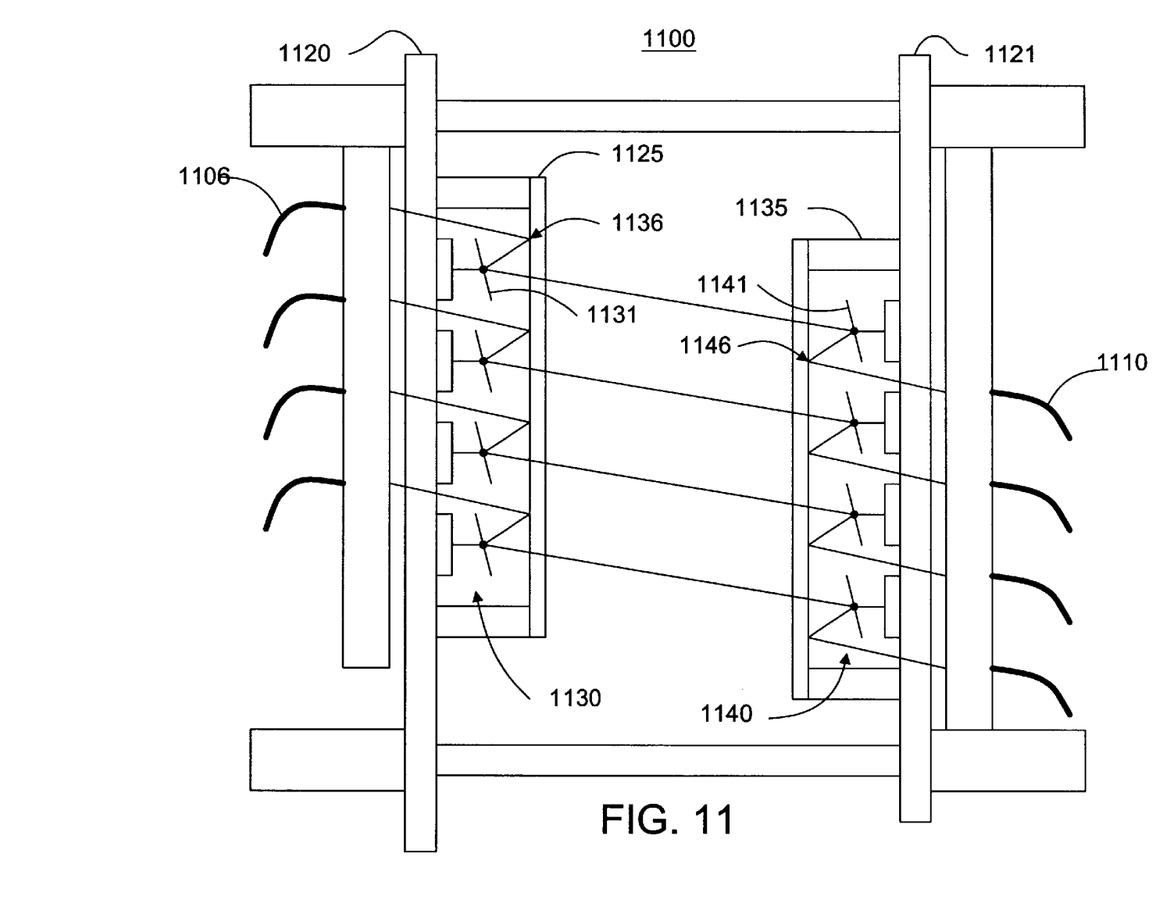
FIG. 11 illustrates an eighth preferred embodiment of a switch architecture with a double package in accordance with the present invention.

FIG. 11 illustrates an eighth preferred embodiment of a switch architecture with a double package in accordance with the present invention. The switch architecture 1100 is similar to the architecture 800 (FIG. 8), except that beam splitter 801 has been eliminated. A first micromirror array 1130 is coupled to a first substrate 1120, and similarly, a second micromirror array 1140 is coupled to a second substrate 1121. The first micromirror array 1130 and second micromirror array 1140 are housed in separate hermetic packages.

In performing a switching operation, a light beam 1101 enters the switch 1100 via an first optical fiber 1106. The light beam 1101 traverses through the first substrate 1120, and a reflecting area 1136, on a first cap 1125, and directs the beam 1101 onto a specific first micromirror 1131. After reflection from the first micromirror 1131, the light beam 1101 is directed through a transparent area on the first cap 1125 towards a transparent area on the second cap 1126. Then, the light beam 1101 is reflected by a specific second mirror 1141 onto a reflective area 1146 of a second cap 1135, where beam 1101 traverses through the second substrate 1121 and couples to a second optical fiber 1110.

Although FIG. 11 illustrates a light beam 1102 traversing switch 1100 from a first optical fiber 1106 on the left to a second optical fiber 1110 on the right, it is understood that the light beam 1102 could also traverse the switch 1100 in either direction. That is, the switch functions similarly when a light beam traverses in the opposite direction.

A double OXC package has been disclosed. In a preferred embodiment, the double package comprises a first cap with reflecting surfaces and a second cap. The first cap, along with a substrate populated with a micromirror array and a set of sidewalls, form a volume which is preferably hermetically sealed. This volume is further packaged by the second cap with another set of sidewalls. With the first cap, only a short distance is used in redirecting the light. This short distance is uniform for each micromirror in the switch. With the second cap, the light beam is folded during the switching operation, resulting in a smaller switch package. By folding the light in the switch architecture, the size of the switch package is reduced. Light may also be folded multiple times to further reduce the size of the switch package or enhance the number of ports to be addressed. A beam splitter or a grating could alternatively be used in place of the second cap. The light can be brought into the OXC package through the substrate, through the first cap directly to the micromirror array, or via waveguides directly to the micromirror array.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A fiber optic cross connect (OXC), comprising:
   an input optical fiber;
   a substrate with a first surface and a second surface, optically coupled to the input optical fiber;
   a first cap optically coupled to the second surface of the substrate;
   a micromirror array optically coupled to the first cap;
   a second cap optically coupled to the micromirror array; and
   an output optical fiber optically coupled to the second cap.

2. The OXC of claim 1, wherein a micromirror of the micromirror array moves such that a path length of a light beam traversing through the OXC is variable.

3. The OXC of claim 1, wherein the micromirror array is coupled to the second surface of the substrate.

4. The OXC of claim 1, wherein the micromirror array is coupled to the first cap.

5. The OXC of claim 1, wherein the first cap comprises a plurality of molded mirrors optically coupled to the second surface of the substrate and to the micromirror array.

6. The OXC of claim 1, further comprising:
   a plurality of collimators intersecting a path of a light beam traversing through the OXC.

7. The OXC of claim 6, wherein the plurality of collimators comprises at least one lens optically coupled to the input optical fiber.

8. The OXC of claim 6, wherein the plurality of collimators comprises at least one lens optically coupled to the output optical fiber.

9. The OXC of claim 6, wherein the plurality of collimators comprises at least one lens coupled to the first surface of the substrate.

10. The OXC of claim 6, wherein the plurality of collimators comprises at least one lens coupled to the second surface of the substrate.

11. The OXC of claim 6, wherein the plurality of collimators is coupled to the first cap.

12. The OXC of claim 6, wherein the plurality of collimators is coup led to the second cap.

13. The OXC of claim 6, wherein the plurality of collimators comprises the input optical fiber, wherein the input optical fiber comprises a shaped end.

14. The OXC of claim 6, wherein the plurality of collimators comprises the output optical fiber, wherein the output optical fiber comprises a shaped end.

15. The OXC of claim 6, wherein the plurality of collimators comprises the input optical fiber, wherein the input optical fiber has a particular refractive index profile.

16. The OXC of claim 6, wherein the plurality of collimators comprises the output optical fiber, wherein the output optical fiber has a particular refractive index profile.

17. The OXC of claim 6, wherein the plurality of collimators comprises the micromirror array, wherein the micromirror array comprises curved mirrors.

18. The OXC of claim 1, further comprising a waveplate between the first cap and the second cap for polarization management.

19. The OXC of claim 6, wherein the plurality of collimators comprises:

a first micromirror of the micromirror array;

one of the plurality of collimators optically coupled to the first micromirror; and a second micromirror of the micromirror array optically coupled to the first cap and the output optical fiber, wherein a size of the first micromirror is different than a size of the second micromirror.

20. The OXC of claim 1, wherein the second cap comprises a grating.

21. An OXC, comprising:

an input optical fiber;

a substrate optically coupled to the input optical fiber;

a first cap optically coupled to the substrate;

a micromirror array, wherein a first micromirror of the micromirror array is optically coupled to the first cap;

a second cap optically coupled to the first micromirror;

a second micromirror of the micromirror array optically coupled to the second cap;

a third micromirror optically coupled to the second cap and the first cap; and an output optical fiber optically coupled to the first cap.

22. An OXC, comprising:

a first substrate;

a first cap optically coupled to the substrate;

a first micromirror array optically coupled to the first cap;

a first output optical fiber optically coupled to the first cap; and a second output optical fiber optically coupled to the first micromirror array;

a second micromirror array optically coupled to the first micromirror array;

a third cap optically coupled to the second micromirror array; and a second substrate optically coupled to the third cap and to the second output optical fiber.

23. The OXC of claim 22, further comprising:

a beam splitter optically coupled to the first micromirror array and the second micromirror array.

24. An OXC, comprising:

a substrate;

a first cap optically coupled to the substrate;

a micromirror array optically coupled to the first cap;

a second cap optically coupled to the micromirror array; and a plurality of optical fibers coupled to the first cap and optically coupled to the micromirror array.

25. An OXC, comprising:

a substrate;

a first cap optically coupled to the substrate;

a micromirror array optically coupled to the first cap;

a second cap optically coupled to the micromirror array; and a plurality of optical fibers coupled to the substrate and optically coupled to the micromirror array.

26. An OXC, comprising:

an input optical fiber;

a substrate optically coupled to the input optical fiber;

a first cap optically coupled to the substrate;

a first micromirror array, wherein a first micromirror of the first micromirror array is optically coupled to the first cap;

a second cap optically coupled to the first micromirror;

a second micromirror array, wherein a second micromirror of the second micromirror array optically coupled to the second cap; and an output optical fiber optically coupled to the first cap.

* * * * *